United States Patent [19]

St. Laurent

[11] 4,124,039

[45] Nov. 7, 1978

[54] PIPE THAWING MACHINE

[76] Inventor: Richard E. St. Laurent, 14 Lavin Ct., Sanford, Me. 04073

[21] Appl. No.: 819,761

[22] Filed: Jul. 28, 1977

[51] Int. Cl.² ............................................. E03B 7/14
[52] U.S. Cl. ................................................... 138/35
[58] Field of Search ..................... 138/35, 32, 178; 141/290

[56] References Cited

U.S. PATENT DOCUMENTS

| 168,352 | 10/1875 | Sloan | 138/35 |
| 1,243,973 | 10/1917 | Philippon | 138/35 |
| 1,361,023 | 12/1920 | Darley | 138/35 |

Primary Examiner—Richard E. Aegerter
Assistant Examiner—L. Footland
Attorney, Agent, or Firm—W. R. Hulbert

[57] ABSTRACT

Machine for thawing frozen pipes by forcing hot water from a heated reservoir through a flexible tube advanced into the pipe as the ice melts with means to return water and melt to the reservoir through a duct sealed to the end of the pipe.

2 Claims, 3 Drawing Figures

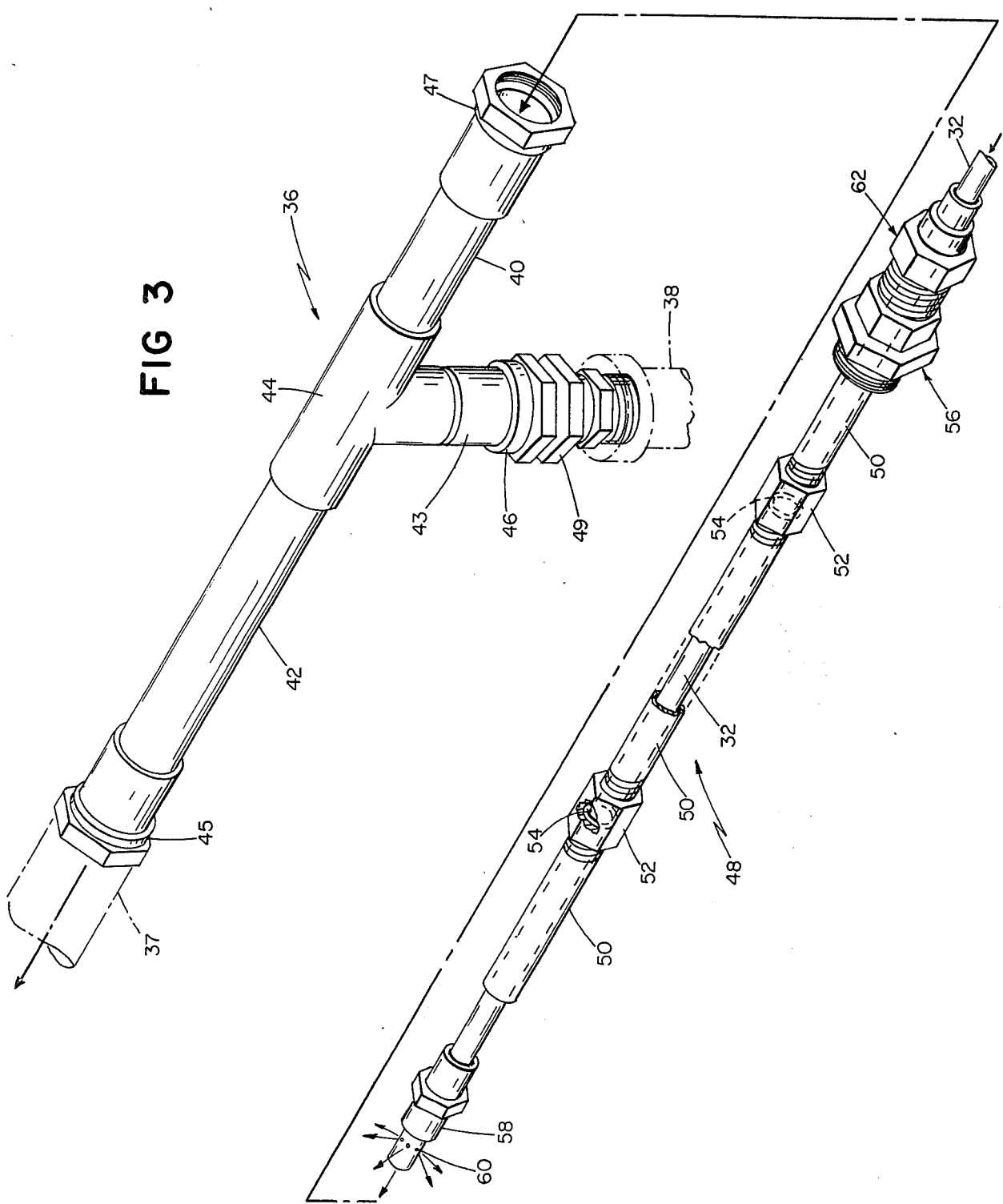

PIPE THAWING MACHINE

FIELD OF THE INVENTION

This invention relates to machines for thawing frozen pipes by hot fluid injection.

BACKGROUND OF THE INVENTION

A well known method for thawing frozen pipes is to inject hot water into the pipe through a flexible tube, while advancing the tube through the pipe as the ice therein melts. A device employing this technique is shown in Mentel U.S. Pat. No. 325,002, "Thawing Machine".

With such devices there is a need constantly to renew the hot water supply and to dispose of the melt. Simpson U.S. Pat. No. 458,503 proposed to solve these problems by catching the melt in a receptacle and cycling it back to a hot water reservoir. However, this technique is messy and can only be used where the receptacle can be placed directly underneath the pipe; and cannot be used, for example, for substantially vertically oriented pipes, or where the space below the pipe is obstructed.

With each of the devices of Mentel and Simpson, it is usually required that water service to the frozen pipe be first shut off at the service gate. Also with each the injected hot water stream is directed substantially coaxially longitudinally of the pipe.

SUMMARY OF THE INVENTION

I provide, in apparatus for thawing a frozen pipe by inserting a flexible tube therein and forcing hot water from a heated reservoir through the tube while advancing the tube as the ice melts, the improvement comprising a hollow member having a fitting for watertight connection to the end of the pipe, a return connection communicating with the reservoir, a flexible tube having an opening at one end, communicating with the reservoir at the other end and adapted to be passed through the hollow member and advanced into the pipe, sealing means in the member surrounding the tube to permit its passage therethrough while preventing leakage to the outside, and means for forcing hot water from the reservoir through the tube into the pipe to thaw the ice therein as the tube is advanced, the return water, including melt, returning to the reservoir through the return connection.

In preferred embodiments a nozzle at the end of the tube directs jets of hot water both forwardly against the ice and outwardly against the interior of the wall; the hollow member provides a straight passage for said tube with the fitting at one end and means for receiving the tube at the other end, the return connection extending from the hollow member intermediate its ends; a pressure tank pump and a fitting connecting the tube to the tank are provided; a pressure regulating means is provided for regulating pressure in the pressure tank; an element for heating is provided in the reservoir; a tube guiding unit arranged to be mounted within the hollow member comprising a hollow structure of lesser outer diameter than the member, spacing means for centering it within the member, a sealing fitting for making a watertight connection to the end of the member through which the unit is inserted, the fitting including an opening through which the tube may pass, and sealing means, preferably at least one O-ring, within the structure for sliding sealing engagement with the outer surface of the tube, whereby the tube may be advanced through the unit into the pipe to be thawed and return water, including melt, may flow to the connection through the space between the outer surface of the unit and the inner surface of the hollow member; and a pressure gauge for continuously sensing the pressure of the return water and melt so as to give immediate indication of completion of the thawing by registering the service pressure of the system which was blocked by ice.

In the most preferred embodiment there is a wheeled main frame, a storage tank comprising the reservoir mounted on the frame, a return conduit connecting the member to the storage tank, a length of flexible tube open at one end, connected to the pressure tank at the other end and arranged to pass through the hollow member into the pipe, means for storing the tube on the frame when not in use, and sealing means within the member to prevent leakage around the tube while permitting passage of the tube therethrough whereby, as hot water is injected into the pipe through the tube, return water, including melt, will be returned to the reservoir for reheating and recirculation.

The invention is especially useful where the pipe end is oriented in other than a horizontal position, or located in a crowded spot — the space underneath it being obstructed; and where water leakage from the pipe would cause damage to the surrounding area. It has the advantages of simplicity, increased efficiency due, among other things, to the heating and cutting action of the outwardly directed water jets against the pipe, and relative freedom from clean up afterwards. Also because the fitting provides a water-tight connection to the pipe, water services do not have to first be turned off at the street service gate. Sensing the back pressure of the water service will indicate when the pipe is completely thawed.

Other advantages and features of the invention will be apparent from what follows.

DESCRIPTION OF PREFERRED EMBODIMENT

Figure 1:
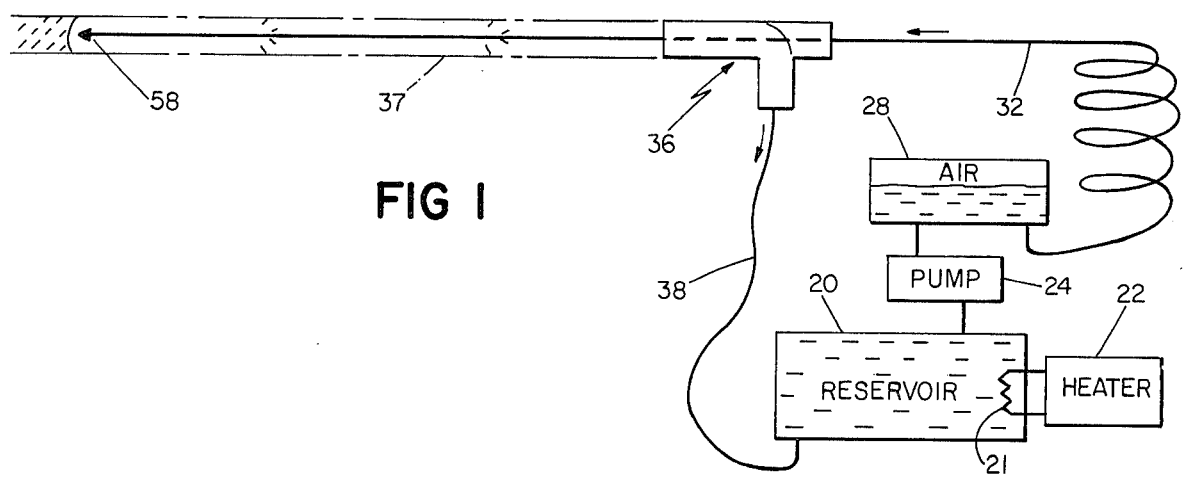
Figure 2:
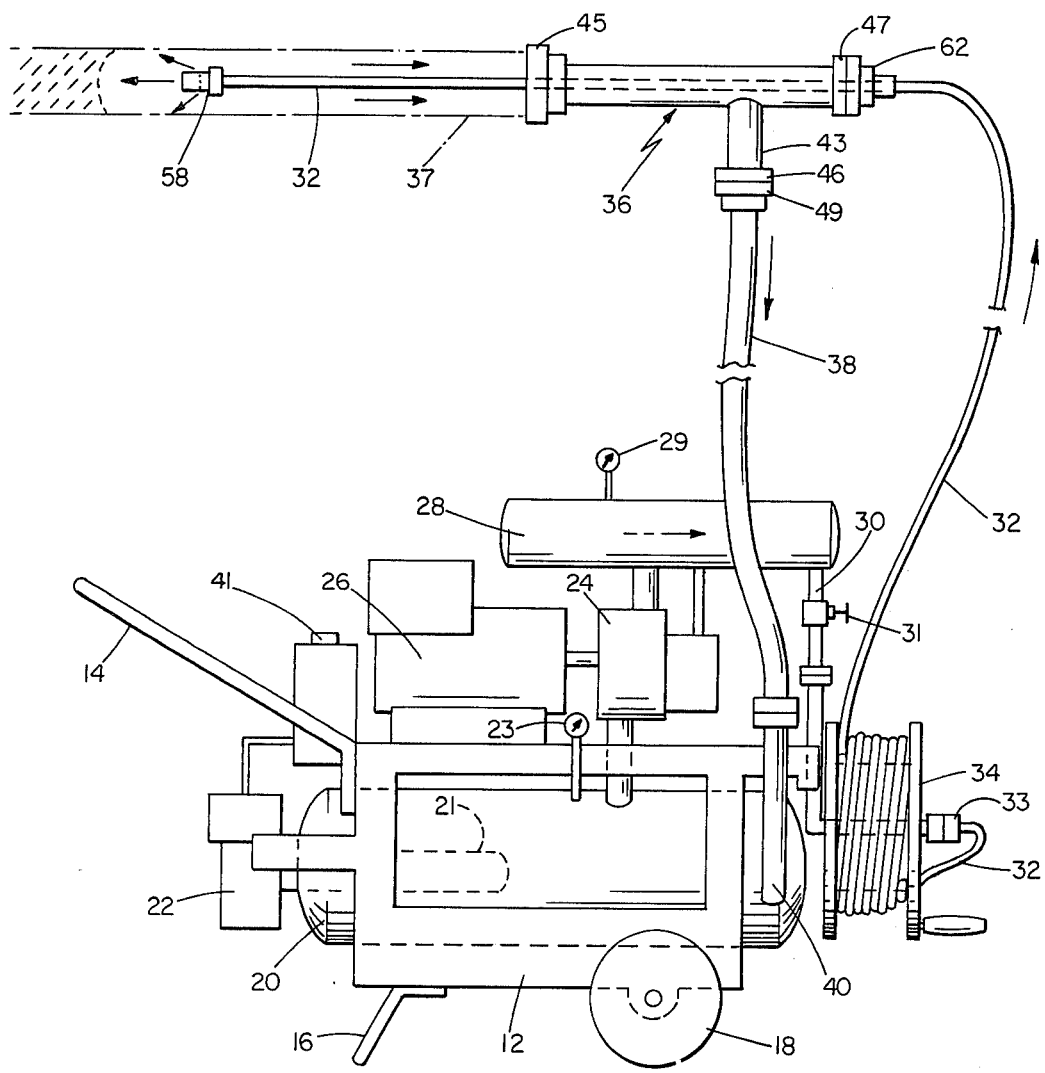

The structure and mode of operation of the invention will become apparent from a consideration of the following detailed description of a preferred embodiment thereof taken in conjunction with the accompanying drawings wherein FIG. 1 is a schematic view illustrating the operation of a typical system employing the novel thawing machine;

FIG. 2 is a side elevation, some parts being shown schematically, of the machine; and FIG. 3 is an exploded view showing the two interfitting components of the "gun" assembly which is adapted to be connected directly to the pipe to be thawed.

DESCRIPTION

Referring first to FIGS. 1 and 2, there are shown the essential parts of a readily portable pipe thawing machine embodying the invention and which is especially adaptable for thawing frozen plastic pipes, such as the under ground service line from a water main in the street to a building. On a main frame 12, provided with a pair of wheels 18, leg or rest 16 and handle 14, are mounted a main storage tank 20 providing a reservoir of suitable capacity (e.g. twelve gallons - 45.4 liters) of water heated by electrical heating element 21 (which may be 120/240 V., 1000 or 1500 W. capacity), pressure tank 28, pump 24 driven by motor 26, control box 41, storage reel 34 and other smaller components to be described. The external connections to the heating element are made through box 22 to which electrical wiring extends through a conduit from control box 41. Either box 22 or control box 41 may contain a suitable thermostatic control (not shown) for maintaining the temperature of the water in the storage tank at 110° to 160° F. (43° to 71° C.). Pressure within the reservoir 20 (and hence within the pipe being thawed) is sensed by gauge 23.

To provide constant flow of hot water under pressure to the thawing tube 32, pump 24 withdraws hot water from the top of tank 20 and supplies it to pressure tank 28 which is provided with an air cushion above the water level (as indicated in FIG. 1). The tank 28 may be a Hydro Cell of 1.5 pint (0.7 liter) capacity at 80 psi (562.48 grams per cm$^2$) and the pump 24 may be driven suitably by motor 26 (1140 rpm, 110 V., 0.3 amp) and controlled by the pressure in the tank to cut in at 40 psi (281.24 gms/cm$^2$) and out at 70 psi (492.17 gms/cm$^2$). The system is desirably provided with a check valve (not shown) in the line between the pump and the pressure tank to prevent back flow and a pressure relief valve (also not shown) communicating with the pressure tank as a safety measure. Suitable pipe size for lines to and from the pump 24 is ½ inch IPS and connections to the main storage tank 20 are welded. Pressure in the pressure tank 28 may be read on gauge 29.

The outlet of the pressure tank 28 is controlled by valve 31 in line 30 which leads to a quick-disconnect rotary fitting 33 on the axis of reel 34 on which is stored a suitable length (say 200 feet; 70 m.) of ¼ inch O.D. flexible tubing one end of which communicates with line 30 through fitting 33 and the other end of which passes through "gun" 36, as will be described below. A return line 38 from "gun" 36 leads into the bottom of tank 20 by welded joint 40.

As indicated generally in FIGS. 1 and 2, the tube 32 is adapted to be advanced through the "gun" 36 into the pipe 37 to be thawed, hot water jetting from nozzle 58 melting the ice and scouring the inner surface of the frozen pipe, while return water and melt pass to the reservoir 20 for re-heating through line 38, which may be a hose of suitable material of ⅝ inch (1.6 cm) I.D. The control unit 41 contains suitable fuses or circuit breakers and switching means for energizing the heating element 21 and the motor 26 when plugged into a suitable outside source of current.

Referring to FIG. 3, the "gun" 36 comprises a "T"-shaped hollow outer member built from sections 40, 42 and 43, preferably of 1 inch O.D. (2.54 cm) copper pipe joined by copper T 44. The leg 43 of the hollow member terminates in a fitting 46 which is adapted to mate with suitable fitting 49 on return line 38. Section 40 terminates in fitting 47 which is adapted for water-tight connection to fitting 56 on the internal guiding unit 48 when the latter is installed within the hollow member 36. Finally, section 42 terminates in fitting 45 which is adapted for water-tight connection to the open end of the pipe to be thawed 37. Since the unit may be used for thawing pipes of different sizes, which may or may not have suitable fittings on their accessible ends, it is desirable that a supply of suitable adaptors (not shown) be carried with the unit so that a water-tight connection may be made by the operator on the job between fitting 46 and pipe 37.

The tube guiding unit 48, which is adapted for mounting within the outer member, functions to permit the flexible tube 32 to be advanced and retracted through the "gun" without water spillage or leaks. It comprises a sleeve of three brass nipples 50 mounted end to end by two brass couplings 52 each of which contains an O-ring 54 making a sliding but water-tight seal with the outer surface of the tubing 32. Nipples, described in the trade as ⅛ inch IPS size which, in fact, have an internal diameter of ¼ inch (0.635 cm), have been found suitable. As already mentioned, the end through which the tube 32 is first introduced carries fitting 56 for mating with fitting 47 on the hollow outer member. This fitting is also provided with suitable extension 62 composed of adapters to reduce the size of the tube inlet to approximately the O.D. of the tube 32. This extension is desirable provided with a grease cup (not shown) to lubricate the tube as it is advanced, not only to facilitate its passage through the "gun" but to assist in maintaining a water-tight seal as it does so. The sleeve is of substantially smaller O.D. than the I.D. of "T"-shaped hollow outer member 36 and is loosely centered by fittings 52 thereby leaving a substantial passage between them to accomodate return water and melt.

The nozzle 58 is mounted at the end of tube 32 by ¼ inch I.D. (0.635 cm) ferrule and jam nut 64 and the nozzle is provided with seven 1/32 inch (0.08 cm) holes 60 through which water under pressure from tank 28 is discharged as fine jets. One of the holes is directed forwardly, for melting ice directly ahead, and the others are arranged in circular array, equally spaced around the nozzle, and angled to direct their jets forwardly at about 35° angles from longitudinal axis.

OPERATION

Using control panel 41, electrical heating element 21 is energized from an external source and the thermostat set to desired water temperature. The tank can, of course, be initially filled with hot water, if available, to reduce heating time. Once the water in storage tank 20 is hot, electric motor 26 is turned on, activating pump 24 to pressurize tank 28. After gun 36 is sealed to the frozen water pipe 37 by fitting 45, valve 31 is opened, allowing hot water under pressure to flow through the flexible tubing (as indicated by arrows in FIGS. 1 and 2) to the nozzle 58, where it exits in fine jets through the seven holes 60, cutting and melting the ice. The cooled water and melt return (as indicated by arrows in FIGS. 1 and 2) to the storage tank by passing through the gun 36 externally of the sealing sleeve and then through the return hose 38. There the cool water is reheated and recycled. Since the volume of melt is essentially the same as the volume of the ice melted, the system of the invention is essentially one of constant volume, and water fed from the reservoir 20 through the tube 32 is replaced by an equal volume of return melt and water through the hose 38, save for initial air pockets during start-up. The 1000 watt heating element is generally adequate to maintain water temperature, but a 1500 watt element can be used where a quicker temperature recovery is needed. The electric circuitry may be adapted for operation on either 120V or 240V current. A bleed valve (not shown) on the return line at the entry to the storage tank is used to bleed the entrapped air that is generally present when thawing is begun, due to the air in the flexible tubing and the water pipe. The check valve in the line between the storage tank and pressure tank prevents backflow into the storage tank. And the pressure-relief valve located in the same line protects the pressure tank against damage caused by a malfunction in pressure regulation.

There is no need to first shut off water pressure at the street when using the machine to thaw the water service line entering a building. Indeed, shutting off the service line first may be difficult when the valve itself is frozen. The gun is simply attached downstream of the usual ball-valve service gate and the nozzle fed into the frozen pipe up to and, if necessary, through the ball valve, the nozzle being small enough to fit through the valve. When thawing is complete, pressure gauge 23 on the storage tank will suddenly jump to the water service pressure, signaling completion of the job. The nozzle and tubing are then drawn back through the ball valve, and service line and the now thawed valve is momentarily closed to allow the gun to be removed without leakage.

What is claimed is:

1. In apparatus for thawing a frozen pipe by inserting a flexible tube therein and forcing hot water from a heated reservoir through the tube while advancing the tube as the ice melts, said apparatus including a hollow member having a fitting for watertight connection to the end of the pipe to be thawed and a return connection communicating with said reservoir, a flexible tube having an opening at one end, communicating with said reservoir at the other end and adapted to be passed through said hollow member and advanced into said pipe, and means for forcing hot water from said reservoir through said tube into said pipe to thaw ice therein as said tube is advanced, the return water and melt returning to said reservoir through said return connection, the improvement comprising a tube guiding and sealing unit arranged to be mounted within said hollow member, said unit comprising a hollow sleeve of lesser outer diameter than the inner diameter of said member, means for mounting said sleeve within said member, a sealing fitting for making a watertight connection to the end of said member through which said unit is inserted, said fitting including an opening through which said tube may pass, and sealing means within said sleeve for sliding sealing engagement with the outer surface of said tube, whereby said tube may be advanced through said unit into the pipe to be thawed and return water and melt may flow to said return connection between the outer surface of said sleeve and the inner surface of said hollow member.

2. In combination with apparatus for thawing a frozen pipe by inserting a flexible tube therein and forcing hot water from a heated reservoir throught the tube to melt the ice, while advancing the tube as the ice melts, said apparatus including a portable main frame, a storage tank comprising said reservoir mounted on said frame, a heating element for heating water in said tank, a pressure tank mounted on said frame, a pressure controlled pump mounted on said frame for pumping hot water from said storage tank into said pressure tank, a hollow member having a fitting for watertight connection to the end of the pipe to be thawed, a return conduit connecting said member to said storage tank, a length of flexible tube with an opening at one end and connected to said pressure tank at the other and arranged to pass through said hollow member into said pipe, a tube guiding and sealing unit arranged to be mounted within said hollow member, said unit comprising a hollow sleeve of lesser outer diameter than said member, means for mounting said sleeve within said member, a sealing fitting for making a watertight connection to the end of said member through which said unit is inserted, said fitting including an opening through which said tube may pass, and sealing means within said sleeve for sliding sealing engagement with the outer surface of said tube, whereby said tube may be advanced through said unit into the pipe to be thawed and return water and melt may flow to said return conduit between the outer surface of said sleeve and the inner surface of said hollow member.

* * * * *